(12) United States Patent
Nachman

(10) Patent No.: US 10,297,084 B2
(45) Date of Patent: *May 21, 2019

(54) IDENTIFICATION OF RELATIVE DISTANCE OF OBJECTS IN IMAGES

(71) Applicant: Google LLC, Mountain View, CA (US)

(72) Inventor: George L. Nachman, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 7 days.

This patent is subject to a terminal disclaimer.

(21) Appl. No.: 15/150,995

(22) Filed: May 10, 2016

(65) Prior Publication Data

US 2016/0253805 A1 Sep. 1, 2016

Related U.S. Application Data

(63) Continuation of application No. 13/633,254, filed on Oct. 2, 2012, now Pat. No. 9,501,831.

(51) Int. Cl.
*G06T 7/73* (2017.01)
*G06T 19/00* (2011.01)
*G06K 9/00* (2006.01)
*G06T 7/579* (2017.01)
*G06K 9/32* (2006.01)

(52) U.S. Cl.
CPC ........ *G06T 19/006* (2013.01); *G06K 9/00671* (2013.01); *G06K 9/00711* (2013.01); *G06T 7/579* (2017.01); *G06T 7/73* (2017.01); *G06K 2009/3291* (2013.01); *G06T 2207/10016* (2013.01)

(58) Field of Classification Search
None
See application file for complete search history.

(56) References Cited

U.S. PATENT DOCUMENTS

| 2003/0235338 | A1 | 12/2003 | Dye | |
|---|---|---|---|---|
| 2004/0101162 | A1 | 5/2004 | Higaki et al. | |
| 2005/0024542 | A1* | 2/2005 | Hahn | G06T 3/4007 348/700 |
| 2008/0042812 | A1* | 2/2008 | Dunsmoir | G06K 9/00805 340/435 |
| 2009/0110239 | A1* | 4/2009 | Chen | G06T 15/205 382/103 |

(Continued)

FOREIGN PATENT DOCUMENTS

WO 2010/073616 1/2010

OTHER PUBLICATIONS

"User Generated Content in Goggles 1.7—Google Mobile Help" [online]. Retrieved from the internet: <support.google.com/mobile/bin/answer>, Mar. 20, 2012, 2 pages.

(Continued)

*Primary Examiner* — Mohammed S Rahaman
(74) *Attorney, Agent, or Firm* — Fish & Richardson P.C.

(57) ABSTRACT

In one aspect, a hand-held device is provided with a display, camera, motion detector and processor. The processor receives a sequence of images from the camera, the relative distance to the object based on the parallax associated with two or more images of the sequence and the motion of the camera is determined, and the image is augmented and displayed based on the relative distances.

21 Claims, 8 Drawing Sheets

(56) References Cited

U.S. PATENT DOCUMENTS

| | | | |
|---|---|---|---|
| 2009/0207282 A1* | 8/2009 | Sasaki | H04N 5/232 348/240.3 |
| 2011/0096832 A1* | 4/2011 | Zhang | H04N 13/0022 375/240.08 |
| 2011/0133914 A1* | 6/2011 | Griffin | G01S 17/48 340/435 |
| 2012/0001901 A1 | 1/2012 | Park | |
| 2012/0162396 A1* | 6/2012 | Huang | H04N 13/026 348/51 |
| 2012/0176477 A1* | 7/2012 | Givon | H04N 13/0011 348/46 |
| 2015/0170367 A1 | 6/2015 | Nachman | |

OTHER PUBLICATIONS

"View Goggles Search History" [online]. Retrieved from the internet: <support.google.com/mobile/bin/answer>, 1 page.

"Translate Text With Goggles—Google Mobile Help" [online]. Retrieved from the internet: <support.google.com/mobile/bin/answer>, Mar. 20, 2012, 2 pages.

"Sharing Goggles Results—Google Mobile Help" [online]. Retrieved from the internet: <support.google.com/mobile/bin/answer>, Mar. 20, 2012, 1 page.

"Search Results Page—Google Mobile Help" [online]. Retrieved from the internet: <support.google.com/mobile/bin/ answer>, Mar. 20, 2012, 1 page.

"Requirements for Using Goggles—Google Mobile Help", [online]. Retrieved from the Internet: <support.google.com/mobile/bin/answer>, Mar. 20, 2012, 1 page.

"Remove or Disable Goggles Search History—Google Mobile Help" [online]. Retrieved from the Internet: <support.google.com/mobile/bin/answer>, Mar. 20, 2012, 1 page.

"Release Notes—Google Mobile Help" [online]. Retrieved from the Internet: <support.google.com/mobile/bin/answer>, Mar. 20, 2012, 2 pages.

"Overview-Google Mobile Help", [online]. Retrieved from the Internet: <support.google.com/mobile/bin/answer>, Mar. 20, 2012, 2 pages.

"Learn More About Goggles Search History and Continuous Mode—Google Mobile Help", [online]. Retrieved from the Internet: <support.google.com/mobile/bin/answer>, Mar. 20, 2012, 1 page.

"Improving Search Results—Google Mobile Help", [online]. Retrieved from the Internet: <support.google.com/mobile/bin/answer>, Mar. 20, 2012, 2 pages.

"Google Goggles", [online]. Retrieved from the Internet: <www.google.com/mobile/goggles>, Mar. 20, 2012, 1 pages.

"Enable Search From Camera—Google Mobile Help" [online]. Retrieved from the Internet: <support.google.com/mobile/bin/answer>, Mar. 20, 2012, 1 page.

"Enable Goggles Search History—Google Mobile Help", [online]. Retrieved from the Internet: <support.google.com/mobile/bin/answer>, Mar. 20, 2012, 1 page.

"Data Usage In Continuous Mode—Google Mobile Help", [online]. Retrieved from the Internet: <support.google.com/mobile/bin/answer>, Mar. 20, 2012, 1 page.

"Continuous Mode in Goggles—Google Mobile Help", [online]. Retrieved from the Internet: <support.google.com/mobile/bin/answer>, Mar. 20, 2012, 1 page.

Jernej Mrovlje and Damir Vrancic, Distance Measuring Based on Stereoscopic Picutres, 9th International PhD Workshop on Systems and Control: Young Generation Viewpoint, Oct. 2008, 6 pages.

en.wikipedia.org/wiki/Polaroid_SX-70, [online]. Polaroid SX-70, Jan. 17, 2012, 4 pages.

Lucas-Kanade Method, http://en.wikipedia.org/wiki/Lucas%E2%80%93Kanade_method [online], Retrieved from the internet Oct. 1, 2012, 4 pages.

Feature Detection (computer vision), http://en.wikipedia.org/wiki/Feature_detection_(computer_vision) [online]. Retrieved from the internet Oct. 1, 2012, 4 pages.

Corner Detection, http://en.wikipedia.org/wiki/corner_detection [online] Retrieved Oct. 1, 2012, 6 pages.

* cited by examiner

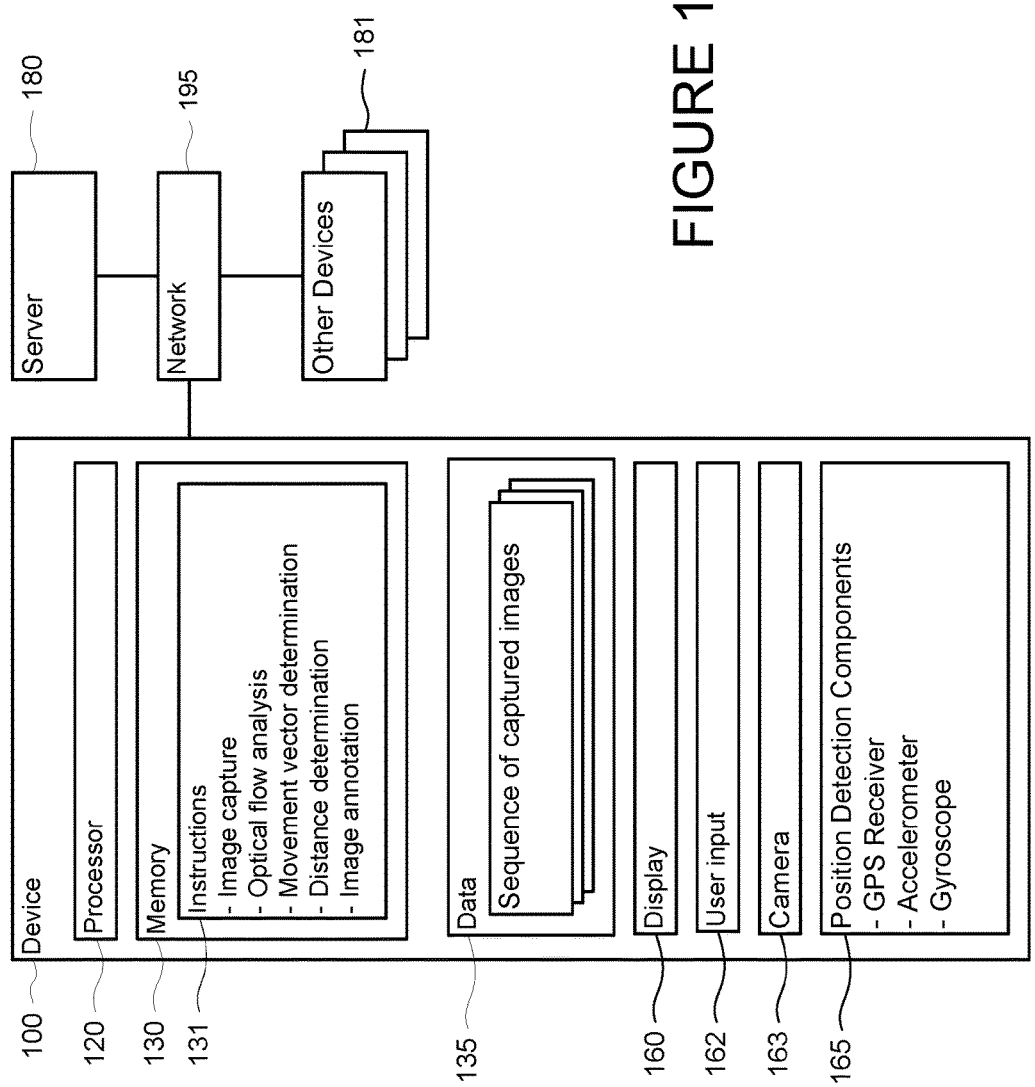

IDENTIFICATION OF RELATIVE DISTANCE OF OBJECTS IN IMAGES

CROSS-REFERENCE TO RELATED APPLICATION

This application is a continuation of U.S. application Ser. No. 13/633,254, filed Oct. 2, 2012, the contents of which are hereby incorporated by reference.

BACKGROUND

Cell phones include increasingly complex components and capabilities. For example, there are augmented reality applications that permit a cell phone to provide more information about the objects within the phone's camera's view. For example, certain cell phone applications can cause a phone to display the images captured by the camera and overlay that display with additional information relating to the objects in those images. The augmented images can be displayed with relatively little delay after being captured.

Augmented reality applications can also transmit an image to a server, where the objects are detected and recognized, and information relating to the object is provided back to the phone for display to a user.

SUMMARY

In one aspect, a system is provided that includes a display, a camera capable of capturing a first image of a first object and a second object at a first time, and a second image of the first and second objects at a second time, the second time occurring after the first time. The system also includes a motion detection component operable to detect changes in the camera's position. The system further includes a processor, where the processor is operable to display an annotated second image on the display, where the annotated second image includes the second image and information related to the closest of the first and second objects to the camera. The closest of the two images can be determined by calculating a distance value for each object based on detected changes in the device's position, the difference between the distance of the first object within the second image relative to its location within the first image, and the distance between the location of the second object within the second image relative to its location within the first image.

Another aspect relates to a method of displaying information about an object. The method can include receiving a sequence of images captured by a camera, receiving movement data identifying the direction in which the camera is moving at the time each image is captured, and detecting, with a processor, a set of objects in the images. The processor also selects, from among the set, the object that is likely to be the closest to the camera based on the parallax associated with positions of the objects in the sequence of images and further based on the movement data. The method can also involve retrieving information associated with the selected object, and providing to a user the retrieved information and an identification of the closest object substantially simultaneously with the camera's capturing of the image of the object.

Still another aspect provides a device for identifying objects. The device can include a display disposed on a side of the device, a camera disposed on another side of the device, a motion detection component, a wireless communication component, a processor capable of receiving data based on the output of the camera as well as the motion detection component and wireless communication component, and a memory accessible by the processor and containing instructions. The instruction can include: receiving a sequence of images from the camera; receiving data identifying the direction of motion of the camera; identifying objects in the images; determining changes in the positions of objects from one image in the sequence to the next; determining the relative distance of the objects to the camera based on parallax and the direction of motion of the camera based on output from the motion detection component; selecting an object from an image based on the object's determined relative distance; receiving information based on the type of the object; and displaying, substantially simultaneously on the display, the image containing the identified object and the information relating to the type of the object.

BRIEF DESCRIPTION OF THE DRAWINGS

FIG. 1 is a functional diagram of a system.

DETAILED DESCRIPTION

Short Summary

Figure 3:
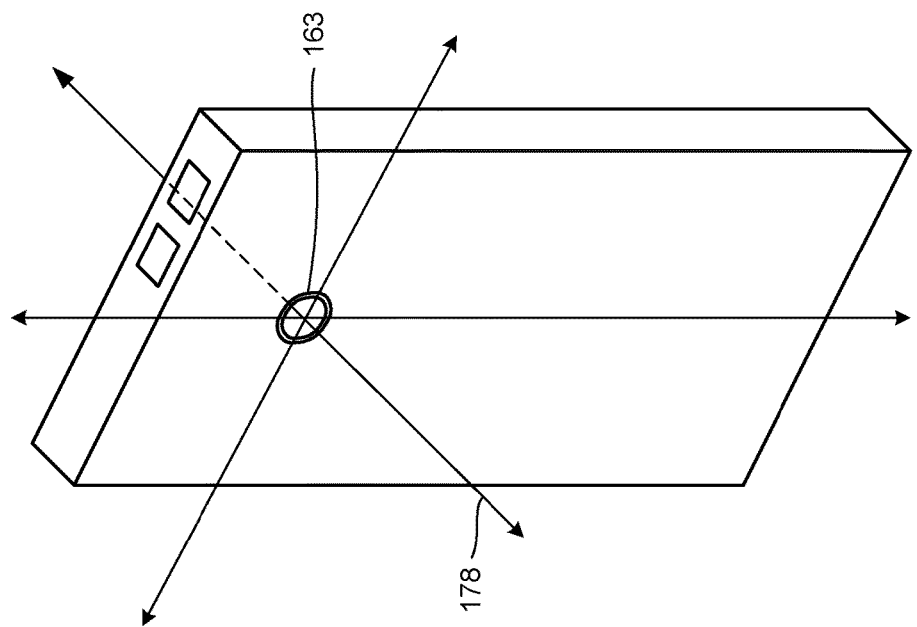
FIG. 3 illustrates the outer appearance of the back of a device.

In one aspect, a system is provided where the relative distance of an object from a hand-held device is determined based on the device's camera and the device's movement detectors. A processor within the device analyzes sequential images captured by the camera to identify changes in the location of at least a first and second object in the image. The relative distance is then determined based on the parallax effect and the detected device movement.

As shown in FIG. 1, device 100 includes a processor 120, memory 130 and other components typically present in general purpose computers.

The memory 130 stores information accessible by processor 120, including instructions 131 and data 135 that can be executed or otherwise used by the processor 120. The memory 130 can be of any type capable of storing information accessible by the processor, including a computer-readable medium or other medium that stores data read with the aid of an electronic device, such as ROM, RAM, a magnetic or solid-state based hard-drive, a memory card, a DVD or other optical disks, as well as other volatile and non-volatile write-capable and read-only memories. Different combinations of the foregoing may be used, whereby different portions of the instructions and data are stored on different types of media.

The instructions 131 can be any set of instructions to be executed directly, such as object code, or indirectly, such as scripts or collections of independent source code modules interpreted on demand, by the processor. For example, the instructions can be stored as computer code on a computer-readable medium. In that regard, the terms "instructions," "programs" and "applications" may be used interchangeably herein. Functions, methods and routines of the instructions are explained in more detail below.

The data 135 can be retrieved, stored or modified by processor 120 in accordance with the instructions 131. For instance, although not limited by any particular data structure, the data can be stored in computer registers, in a relational database as a table having a plurality of different fields and records, XML documents or flat files. The data can also be formatted in any computer-readable format. Examples include storing image data as bitmaps such as grids of pixels that are stored in accordance with formats that are compressed or uncompressed, lossless, e.g., BMP, or lossy, e.g., JPEG, and bitmap or vector-based, e.g., SVG, as well as computer instructions for drawing graphics. The data can include any information sufficient to identify the relevant information, such as numbers, descriptive text, proprietary codes, references to data stored in other areas of the same memory or different memories, including other network locations, or information that is used by a function to calculate the relevant data.

The processor 120 can be any conventional processor, such as processors from Intel Corporation or Advanced Micro Devices. Alternatively, the processor can be a dedicated device such as an ASIC. Although FIG. 1 functionally illustrates the processor, memory, and other elements as being within the same block, the processor and memory can actually include multiple processors and memories that are not stored within the same physical housing. For example, rather than being stored in the same computer, processor 120 and memory 130 can be stored in separate devices. Although advantages may result from locating the processor 120 and memory 130 within the same housing of a single device, various processes can be performed externally to the device and various data can be stored externally of the device. For example, if a processor or memory used or required by the device 100 is externally located, device 100 can obtain the required information wirelessly. A server can display information by transmitting, over a network, the information to device 100 such that the information is shown on a display 160 incorporated in device 100. Accordingly, although references to a processor or memory herein will assume that the processor and memory are stored internally within device 100, such references will be understood to include references to a collection of processors or computers or memories that operate in parallel and not be located a single housing.

The device 100 can be at one node of a network 195 and capable of directly and indirectly communicating with other nodes of the network such as a server 180 or other devices 181 with use of a communication component. Network 195 and the device's communication with other devices, including computers, connected to the network can include and use various configurations and protocols including cellular networks such as 4G LTE, other wireless networks such as WiFi, the Internet, intranets, virtual private networks, local Ethernet networks, private networks using communication protocols proprietary to one or more companies, instant messaging, HTTP and SMTP, and various combinations of the foregoing. Although only a few devices are depicted in FIG. 1, a typical system can include a large number of connected devices.

While not limited to any particular type of product, device 100 can be a cell phone, tablet or portable personal computer intended for use by a person and components normally used in connection with such devices such as: an electronic display 160, e.g., a small LCD touch-screen, a monitor having a screen, a projector, a television, or any other electrical device that is operable to display information; user input 162, e.g., a mouse, keyboard, touch screen or microphone; camera 163; speakers; a network interface device and; all of the components used for connecting these elements to one another. Indeed, devices in accordance with the systems and methods described herein can include any device capable of processing instructions and transmitting data to and from humans including general purpose computers.

The device can further include a component 165 for detecting the geographic position and orientation of the device. For example, device 100 includes a GPS receiver to determine the device's latitude, longitude and altitude position. Another component can include software for determining the geographic position of the device based on other signals received at the device, such as signals received at a cell phone's antenna from one or more cell phone towers if the client device is a cell phone. The position detection component 165 can also include an accelerometer, gyroscope or other component that can detect changes in the device's position or orientation. By way of example only, if the device started at rest, accelerometers can be used to determine the direction in which the device's position was changed and estimate the velocity of the change. Component 165 can also determine the device's pitch, yaw or roll or changes thereto relative to the direction of gravity or a plane perpendicular thereto.

Figure 2:
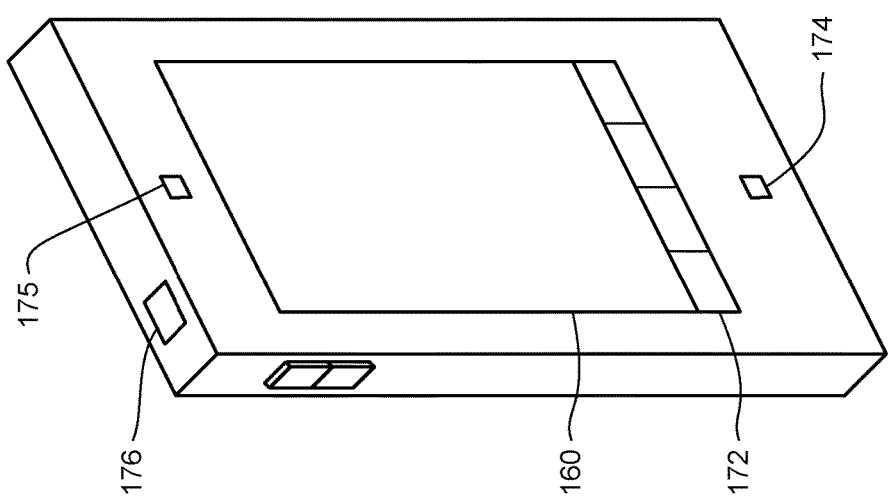
FIG. 2 illustrates the outer appearance of the front of a device.

FIGS. 2 and 3 illustrate one possible configuration of device 100. The front side of the device includes a touchscreen display 160, buttons 172, speaker 175, microphone 174 and a cell-phone antenna 176. As shown in FIG. 3, a camera is disposed on the back side of the device. For ease of understanding and not limitation, that the camera angle is assumed to be fixed relative to the orientation of the device. In that regard, the phone and the camera can change position by moving along one or more of the axes 178 shown in FIG. 4 and can also change its orientation by rotating relative to one or more of the axes.

In addition to the operations illustrated by way of example in FIG. 12, operations in accordance with the system and method will now be described. Various operations can be handled in a different order or simultaneously, and each operation can be composed of other operations.

Figure 4:
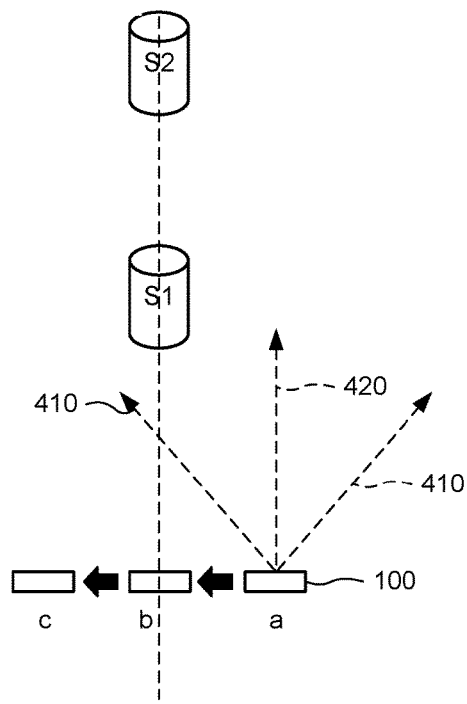
FIG. 4 is a diagram of the movement of a camera-equipped device relative to two stationary objects.
Figure 12:
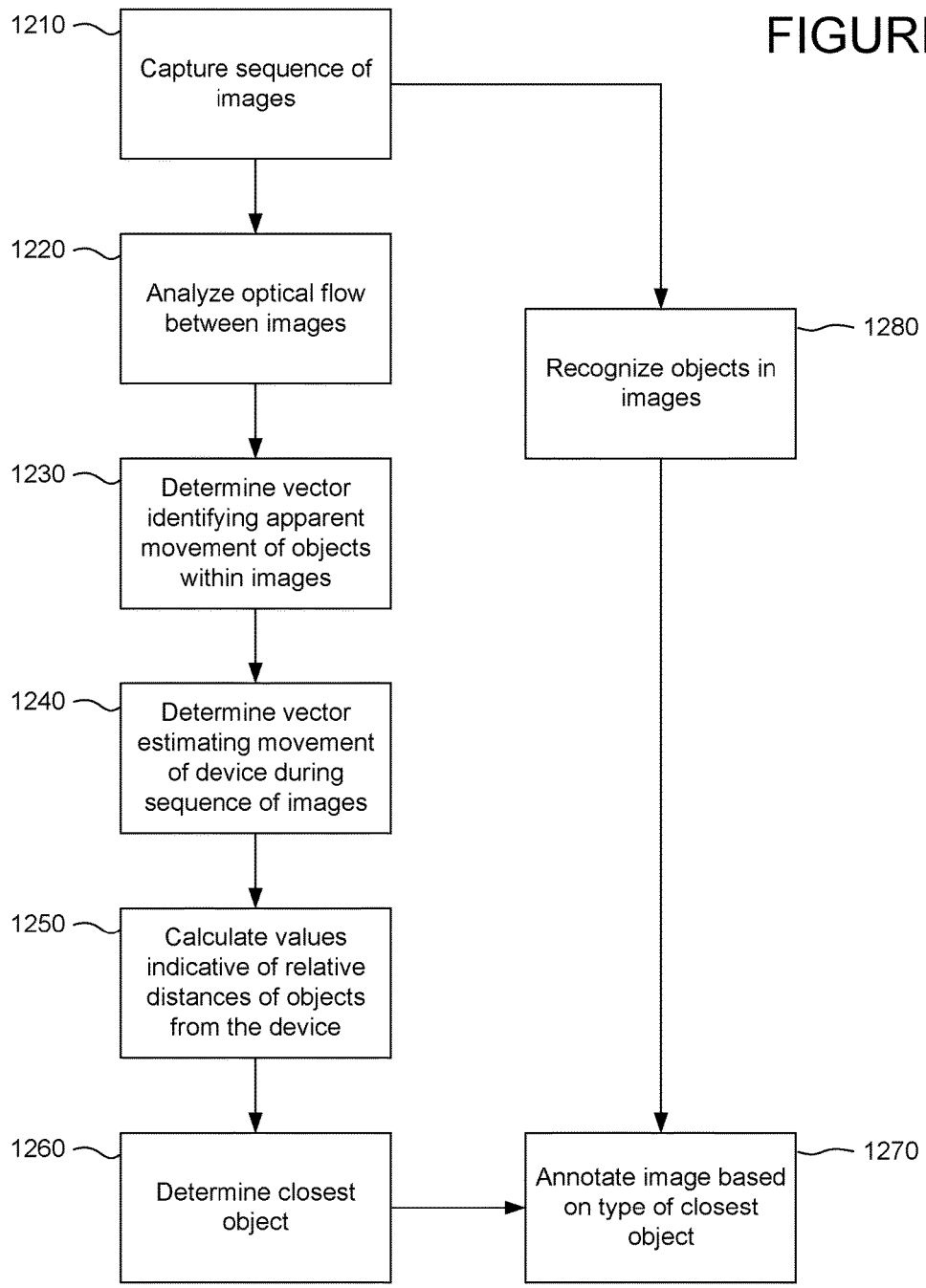
FIG. 12 is a flowchart.

As indicated by block 1210 of FIG. 12, the device 100 captures a set of images of objects from different positions. FIG. 4 diagrammatically illustrates one manner in which multiple images of different objects can be taken. In one aspect, the objects would include objects found in any typical outside or inside environment, such as landmarks or buildings when the user is on a street or shelves of products when the user is inside a store. At a first position "a", the camera of device 100, shown in top-down view, captures an image of stationary objects S1 and S2 within field of view 410 at camera angle 420. The device then moves to the left relative to the camera angle 420 to position "b" and takes another image of the objects. In this example, the device once again moves to the left to position "c" and captures a third image of the objects.

The images can be captured automatically and the movement can result from user manipulation of the device. For example, the user can activate a program that is intended to provide the user with information about the objects in the camera's field of view. Upon such activation, device 100 can take a sequence of pictures and store the resulting images in memory 130. The set of images can include frames of a video captured by the device's camera 163. If the device is a cell phone and the camera is a common camera for cell phones, the images can be captured as frames of a video stream at a rate of 10-15 frames/second or greater. The device can be intentionally moved by the user, or the movement can result from the jitter that often naturally occurs when a person holds up a device.

Figure 5:
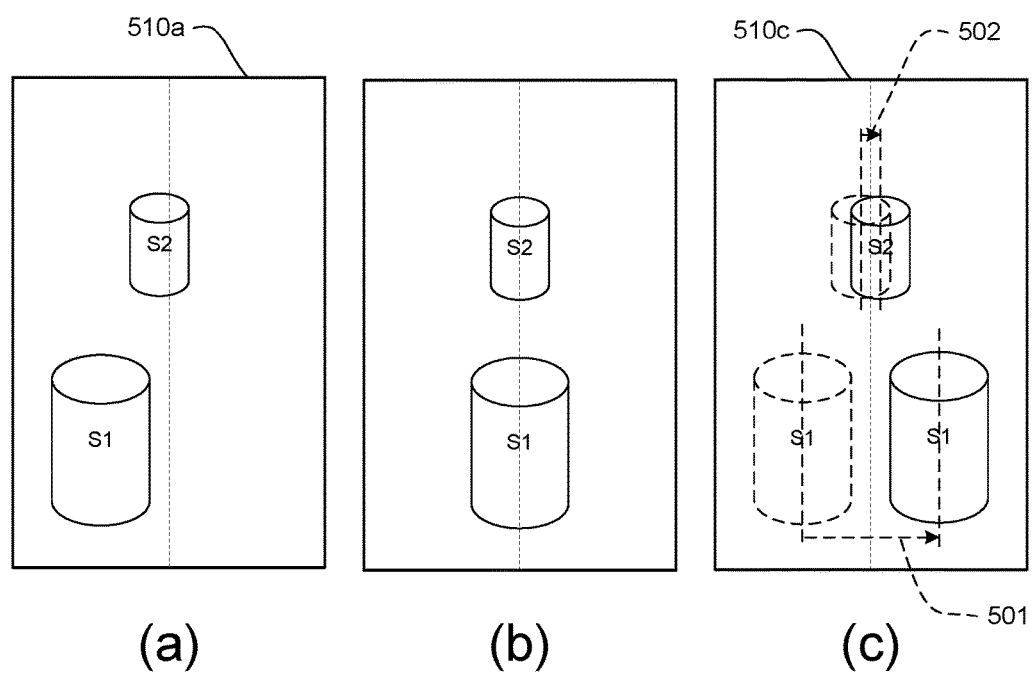
FIG. 5 illustrates potential images captured by the device illustrated in FIG. 4.

As the camera moves from position to position, the position of objects relative to the captured images will change. FIGS. 5(a)-(c) illustrate the three images that device 100 has taken at the positions "a", "b" and "c", respectively. For ease of illustration, certain aspects of the figures are not to scale. Due to the parallax effect, the closer a stationary object is to a moving camera, the greater the change of the position of the object from one image in the sequence to the next. Accordingly, because stationary object S1 is closer to device 100 than stationary object S2, the position of object S1 moves a greater distance 501 to the right than the distance 502 that object S2 moves, as measured relative to the center or edges of the images.

The device can also use object detection and recognition to identify the type of object appearing in the image. For example, the device can identify different objects in the image and then determine the type of object, e.g., a car versus a building. If the device 100 contains insufficient resources to perform the recognition, device 100 can transmit all or portion of the image to server 171 via network 195 and then process the results provided by the server.

The object detection can be performed by using a FAST feature detector with non-maximum suppression. Different features can be ranked by average center/edge difference, where weaker features are prevented from being within a certain distance of higher-ranked features. The system and method is not limited to any particular method of object detection.

The change in the objects' position from one image to another image can be determined by using a variety of image analytical techniques including but not limited to optical flow. For example and as reflected in block 1220 of FIG. 12, optical flow can be used to determine a vector representing the change in position of various points from one image to another, e.g., potentially each pixel.

The optical flow can be used in connection with the aforementioned feature detection. By way of further example only, a Lucas-Kanade pyramidal optical flow method can be used to track feature correspondence between images. The processor identifies features within the image that are sufficiently unique to be identified in the next image. The features may be identified at course or fine resolutions. Once the feature is identified, the processor selects a point within the feature, such as but not limited to a pixel near the center of the feature, and selects a rectangular patch surrounding that point. The processor tracks the feature from image to image by searching each subsequent image for a rectangular portion in the subsequent image that matches the patch. The feature correspondences can be stored in a circular buffer for a certain period of time, e.g., a number of seconds, so the processor can replay the flow information in order to align features from an earlier image, which can be annotated, with their position within the latest image. A second-order minimization algorithm can be used in conjunction with optical flow to improve its performance. Once objects are identified, they can have positions and scales tracked and updated from frame to frame according to the features that fall within or around a bounding box created for the object. By way of example, the processor can analyze some or all of the points around an area of interest, weigh them by distance to the center of the area, remove outliers and compute a weighted translation and scale based on the remaining points. Optical flow can be subject to drift, in which case relocalization can be used and, if the relocalization fails, tracking of the object can be stopped until the object is reacquired.

Typically, the greater the change in an object's position within a sequence of images, the closer the object is to the camera. However, this is not always true in connection with moving objects. In the illustrative example of FIG. 6, device 600 is moving to the left as its camera captures images of stationary object S3 and moving object M4. Object M4 is moving to the right as the camera moves to the left. As shown by the successive images of FIG. 7, the stationary object S3 moves to the right within images 710a and 710c as the device moves to the left. Object M4 also moves to the right within the images, but its motion increases the distance 702 between its positions in images 710a and 710c compared to the parallax effect for stationary objects. In other words, the distance 702 is greater than what the distance would have been if the object was stationary. Accordingly, while the parallax effect can be used to estimate that the closest stationary object to the camera is the object that moved the most between successive images, the effect is less reliable when one or more of the objects is moving.

The motion detectors of the device may be used to help determine whether the movement of an object is due to the motion of the camera or the motion of the object. For example and as reflected in blocks 1230 and 1240 of FIG. 12, the a value may be calculated that is based on the movement of the object within an image and the detected movement of the camera independent of the image. The motion of the objects, e.g., from one image to the next, is evaluated relative to the device's motion.

The velocity of the camera, including its direction of movement, at the particular moment that an image is captured can be estimated from its accelerometers and other motion detecting components 165.

In one aspect and as reflected by block 1250, a value $R_i[t]$ can be calculated that is based on the velocity of the object in the current image, based on its position between successive frames, and the detected velocity of the camera. The value can be calculated as follows:

$O_i$=the $i^{th}$ object detected in the current image;

t=the time at which the current image was captured where t is a sequence number, e.g., 1, 2, 3, representative of the relative time of capture rather than a specific time of day and the images are captured at regular intervals;

t−1=the time at which the prior image was captured;

$V_c[t]$=a vector representing an estimate of the camera's velocity between the current image and the prior image;

$V_i[t]$=the difference of the position vectors where a position vector is an (x,y) coordinate held in a column vector [x;y]) of $O_i$ at time t and time t−1; and $R_i$=a value based on the estimated distance of the $i^{th}$ object to the camera, where greater values indicate that the object is relatively close, where $R_i[t]=V_i[t]$ dot product $(-1*V_c[t])$.

If $R_i[t]$ is greater than $R_j[t]$, where "j" represents the index of the $j^{th}$ object detected in the current image and is not equal to i, object $O_i$ is assumed to be closer to the camera than $O_j$. To the extent the optical flow algorithm outputs a quadrilateral, not a position, the center point of the quadrilateral can be used as the object's position.

Figure 6:
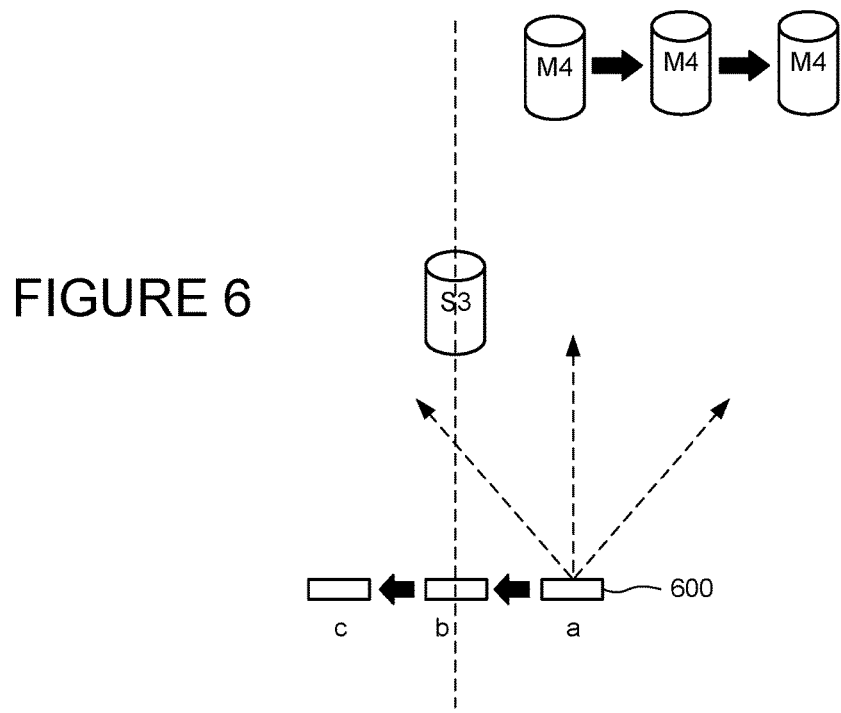
FIG. 6 is a diagram of the movement of a camera-equipped device relative to a stationary object and a moving object.
Figure 7:
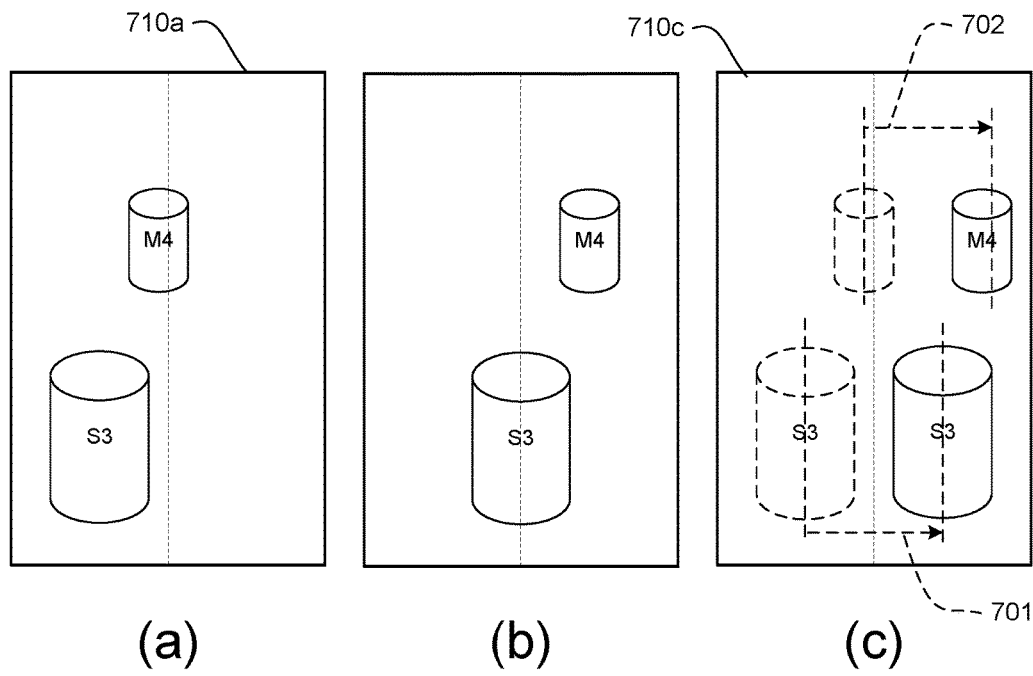
FIG. 7 illustrates potential images captured by the device illustrated in FIG. 6.
Figure 8:
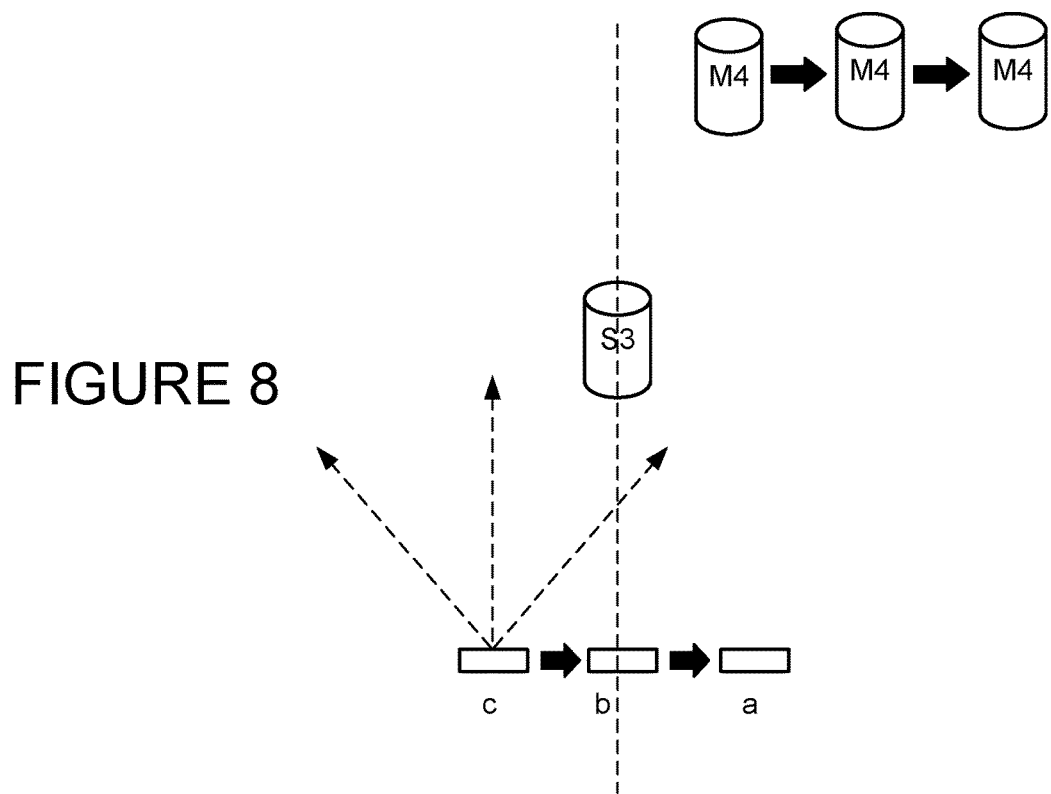
FIG. 8 is a diagram of the movement of a camera-equipped device relative to a stationary object and a moving object.
Figure 9:
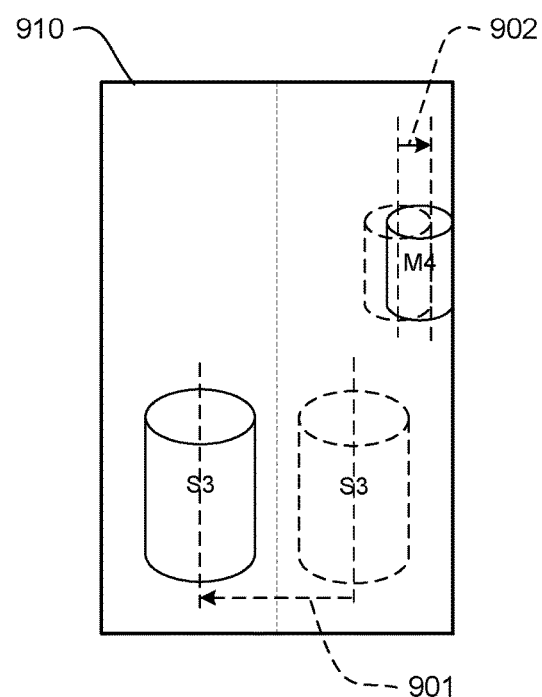
FIG. 9 illustrates potential images captured by the device illustrated in FIG. 8.

By comparing relative distance values taken over time, the likelihood of mistaking moving objects for close objects can be mitigated. For example, as shown in FIGS. 6 and 7, the moving object M4 moves to the right as the device moves to the left. FIGS. 8 and 9 provide an example of the device returning to its original position by moving to the right. As illustrated in image 910, which is the last image of the sequence, the parallax effect causes the stationary object S3 to move to the left to its original position. However, because moving object M4 is moving to the right, object M4 does not return to its original position. Rather, the moving object moves to a different position which can also be to the right, i.e., the same direction as the device.

A history can be kept of the relative distance calculations over multiple images in order to account for moving objects. For example, a moving average can be calculated for each object where higher values are associated with closer objects and the moving average is determined by:

alpha=a constant between 0 and 1;
N=the total number of images;
MovingAverage($R_i$,t)=alpha*$R_i$[t]+(1-alpha)*MovingAverage($R_i$,t-1); and
MovingAverage($R_i$,t) is defined to be 0 when t is 0.

More importance can be ascribed to recent determinations than earlier determinations. Alpha in the foregoing equation can be selected to match a desired level of sensitivity. The lower the value of alpha, the greater the importance placed on the most recent images and, thus, the higher sensitivity to occasional errors in motion detection. The higher the value of alpha, the less sensitivity to instantaneous changes. In some aspects, alpha values equal to or greater than 0.1 can help avoid instability. In some aspects, an alpha value equal to or near 0.5 provides an acceptable balance between the importance of the more recent image and lesser importance of the older images. In addition to being fixed, the value of alpha can also be dynamically determined by the processor based on various criteria, including determinations made with respect to the accuracy of its movement detectors.

Although many of the figures provide the example of motion in a single direction, such as left or right, the system and method can be applied in multiple dimensions. For example, measuring the relative distance of an object can be difficult if the motion of the car is perfectly parallel to the motion of the device. However, the device can be moved up and down as well as from side-to-side, in which case the left-to-right motion of the car may have little to no effect on the processor's ability to use the parallax effect in the up and down direction to estimate the relative distance of the car compared to other objects.

Figure 10:
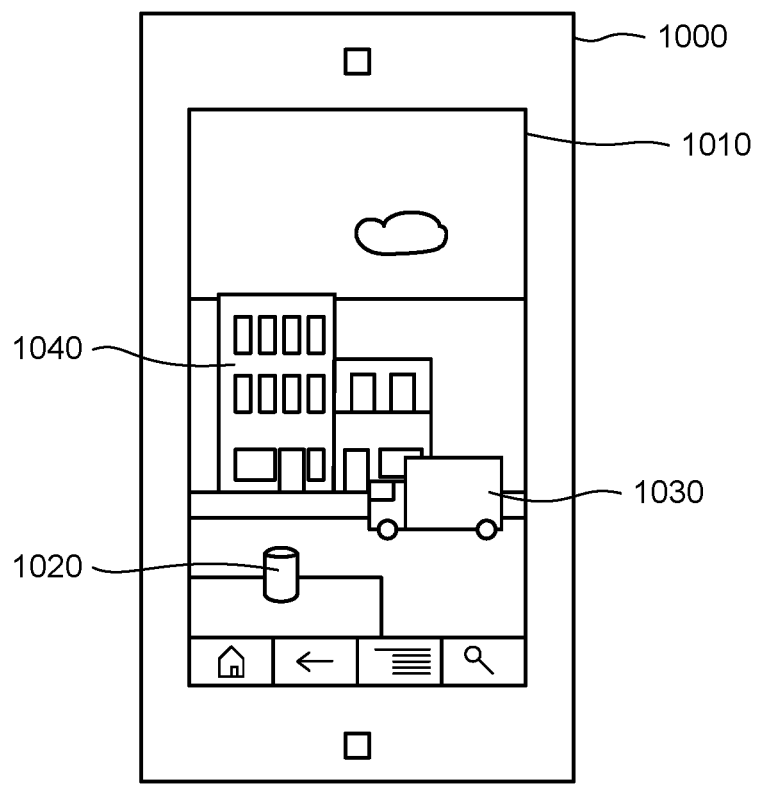
FIG. 10 illustrates a device displaying an image prior to identification of an object of likely interest to the device's user.
Figure 11:
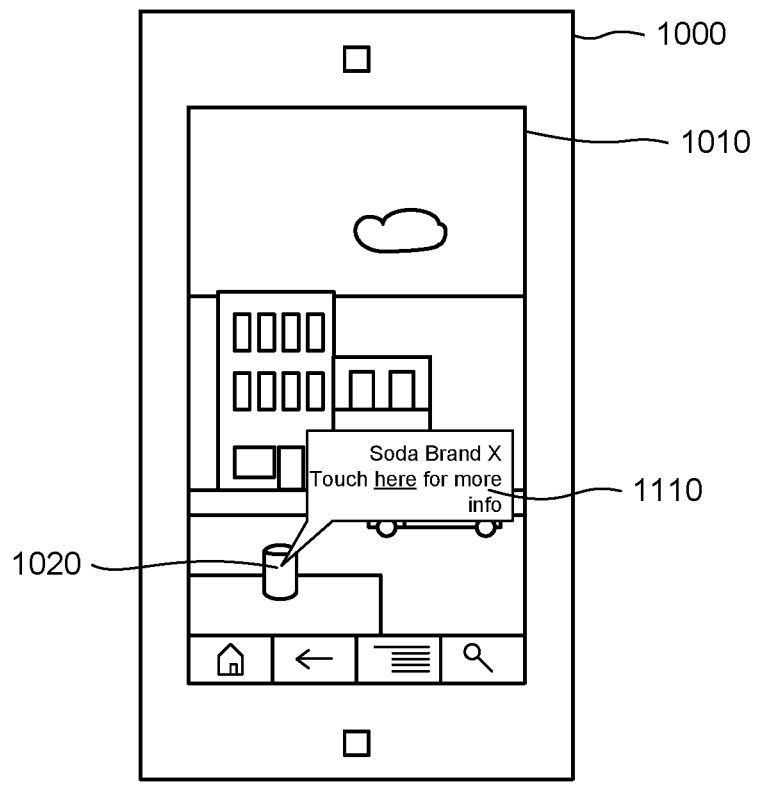
FIG. 11 illustrates a device displaying an image after identification of an object of likely interest to the device's user.

The identification of the closest object can be used for a variety of purposes. For example as reflected in blocks 1260 and 1270 of FIG. 12, the system and method can be used in connection with an augmented reality application that recognizes multiple objects in the camera's field of view. As shown in FIG. 10, the user can initiate an application that displays on screen 1010 of device 1000, in real time, the images captured by the device's camera. When the user holds up the phone and moves the camera in different directions, the application can use the aforementioned methods to identify the can of soda 1020 as the closest object of interest among the objects shown in the screen, as compared to moving truck 1030 or stationary building 1040. As shown in FIG. 11, the application can use a visual identifier 1110 to identify the object or provide more information about the object. Such information can be obtained from a server over a cellular network, either automatically or in response to a user request. In one aspect, a stream of augmented images are shown to the user so that image of the objects is displayed substantially simultaneously as the objects are captured, e.g., the augmented images are displayed as soon after capture as the then-available processing power of the system permits the image to be augmented and displayed. In some aspects, the processing power may be such that a human perceives only a small lag, or no lag at all, between the environment of objects captured by the then-current camera angle and the display of an image corresponding with that camera angle.

The identification of the closest object as described above can also be used as one component of a larger system and method of determining relative distances of objects. For example, the foregoing determinations may provide one signal of a multiple number of signals that are used to rank objects based on an estimate of their relative distance or the likelihood that the object is the closest to the camera relative to other object. Weighting factors can be used in combination with other techniques for determining the position of an object relative to the device, e.g., sonar, laser depth finders, stereoscopic imaging and other position analytical methods. Yet further, the signal can be used alone or in combination with other signals to search advertisements of likely interest to the user of the device, e.g., although advertisements can be selected on the assumption that the user is most likely to be interested in the object that is closest to the user that assumption can be outweighed by other factors.

As noted above, various steps can be performed in a different order than the foregoing examples. For example, object recognition can be performed before or after optical flow analysis. However, in certain systems, object recognition can take longer than optical flow analysis in which case the optical flow detection can be performed first. As reflected in block 1280 of FIG. 12, object recognition analysis of the first image of the sequence may be performed in parallel with the optical flow analysis. If such a device displays an augmented version of the last image to the user, the device can use the optical flow determinations to identify where the objects recognized in the first image now appear in the last image.

As these and other variations and combinations of the features described above can be utilized without departing from the systems and methods as defined by the claims, the foregoing description of examples should be taken by way of illustration rather than by way of limitation of the subject matter defined by the claims. It will also be understood that the provision of examples as well as clauses phrased as "such as," "e.g.", "including" and the like should not be interpreted as limiting the claimed subject matter to the specific examples; rather, the examples are intended to illustrate only some of many possible aspects. The sample values, types and configurations of data described and shown in the figures are for the purposes of illustration only. Unless expressly stated to the contrary, every feature in a given embodiment, alternative or example can be used in any other embodiment, alternative or example herein.

The invention claimed is:

1. A computer-implemented method comprising:
    capturing, by a camera, a plurality of images, each image being of a first object and a second object;
    determining pairs of successive images, each pair of successive images being a respective first image of the first object and the second object, and a respective second image of the first object and the second object at a later time than the respective first image is captured, wherein the respective second image is different from the respective first image;
    for each pair of successive images:
        detecting, using a motion detecting component, a velocity, including direction of movement, of the camera between the respective first image and the respective second image;
        calculating a first position vector representing a difference in position of the first object between the respective first image and the respective second image;
        calculating a second position vector representing a difference in position of the second object between the respective first image and the respective second image;
        determining a first value calculated based on the first position vector and the detected velocity of the camera;
        determining a second value calculated based on the second position vector and the detected velocity of the camera;
    determining a first moving average value based on the first values determined for the pairs of successive images;
    determining a second moving average value based on the second values determined for the pairs of successive images;
    determining that the first moving average value is greater than the second moving average value; and
    in response to determining that the first moving value is greater than the second moving value, determining that the first object is closer to the camera than the second object and providing, for output, information regarding the first object without providing information regarding the second object.

2. The method of claim 1, wherein in response to capturing the second image of the first object and the second object at a later time than the first image is captured, providing information regarding the first object without providing information regarding the second object comprises:
    providing the information regarding the first object without receiving additional input from a user after capturing the second image.

3. The method of claim 1, wherein providing information regarding the first object without providing information regarding the second object comprises providing information that describes the first object.

4. The method of claim 1, wherein providing information regarding the first object without providing information regarding the second object comprises providing an augmented reality overlay that includes information regarding the first object.

5. The method of claim 1, wherein capturing a first image of a first object and a second object comprises:
    capturing the first image of the first object and the second object using a camera of a mobile computing device.

6. The method of claim 5, wherein the first object is moving faster than the second object relative to the camera.

7. The method of claim 1, wherein the first object is moving faster than the second object.

8. A system comprising:
    one or more computers and one or more storage devices storing instructions that are operable, when executed by the one or more computers, to cause the one or more computers to perform operations comprising:
        capturing, by a camera, a plurality of images, each image being of a first object and a second object;
        determining pairs of successive images, each pair of successive images being a respective first image of the first object and the second object, and a respective second image of the first object and the second object at a later time than the respective first image is captured, wherein the respective second image is different from the respective first image;
        for each pair of successive images:
            detecting, using a motion detecting component, a velocity, including direction of movement, of the camera between the respective first image and the respective second image;
            calculating a first position vector representing a difference in position of the first object between the respective first image and the respective second image;
            calculating a second position vector representing a difference in position of the second object between the respective first image and the respective second image;
            determining a first value calculated based on the first position vector and the detected velocity of the camera;
            determining a second value calculated based on the second position vector and the detected velocity of the camera;
        determining a first moving average value based on the first values determined for the pairs of successive images;
        determining a second moving average value based on the second values determined for the pairs of successive images;
        determining that the first moving average value is greater than the second moving average value; and
        in response to determining that the first moving value is greater than the second moving value, determining that the first object is closer to the camera than the second object and providing, for output, information regarding the first object without providing information regarding the second object.

9. The system of claim 8, wherein in response to capturing the second image of the first object and the second object at a later time than the first image is captured, providing information regarding the first object without providing information regarding the second object comprises:
    providing the information regarding the first object without receiving additional input from a user after captured the second image.

10. The system of claim 8, wherein providing information regarding the first object without providing information regarding the second object comprises providing information that describes the first object.

11. The system of claim 8, wherein providing information regarding the first object without providing information regarding the second object comprises providing an augmented reality overlay that includes information regarding the first object.

12. The system of claim 8, wherein capturing a first image of a first object and a second object comprises:
capturing the first image of the first object and the second object using a camera of a mobile computing device.

13. The system of claim 12, wherein the first object is moving faster than the second object relative to the camera.

14. The system of claim 8, wherein the first object is moving faster than the second object.

15. A non-transitory computer-readable medium storing software comprising instructions executable by one or more computers which, upon such execution, cause the one or more computers to perform operations comprising:
capturing, by a camera, a plurality of images, each image being of a first object and a second object;
determining pairs of successive images, each pair of successive images being a respective first image of the first object and the second object, and a respective second image of the first object and the second object at a later time than the respective first image is captured, wherein the respective second image is different from the respective first image;
for each pair of successive images:
detecting, using a motion detecting component, a velocity, including direction of movement, of the camera between the respective first image and the respective second image;
calculating a first position vector representing a difference in position of the first object between the respective first image and the respective second image;
calculating a second position vector representing a difference in position of the second object between the respective first image and the respective second image;
determining a first value calculated based on the first position vector and the detected velocity of the camera;
determining a second value calculated based on the second position vector and the detected velocity of the camera;
determining a first moving average value based on the first values determined for the pairs of successive images;
determining a second moving average value based on the second values determined for the pairs of successive images;
determining that the first moving average value is greater than the second moving average value; and
in response to determining that the first moving value is greater than the second moving value, determining that the first object is closer to the camera than the second object and providing, for output, information regarding the first object without providing information regarding the second object.

16. The medium of claim 15, wherein in response to capturing the second image of the first object and the second object at a later time than the first image is captured, providing information regarding the first object without providing information regarding the second object comprises:
providing the information regarding the first object without receiving additional input from a user after capturing the second image.

17. The medium of claim 15, wherein providing information regarding the first object without providing information regarding the second object comprises providing information that describes the first object.

18. The medium of claim 15, wherein providing information regarding the first object without providing information regarding the second object comprises providing an augmented reality overlay that includes information regarding the first object.

19. The method of claim 1, wherein determining the first moving average and determining the second moving average includes weighting the importance of most recent images greater than the importance of less recent images.

20. The system of claim 8, wherein determining the first moving average and determining the second moving average includes weighting the importance of most recent images greater than the importance of less recent images.

21. The non-transitory computer-readable medium of claim 15, wherein determining the first moving average and determining the second moving average includes weighting the importance of most recent images greater than the importance of less recent images.

* * * * *

UNITED STATES PATENT AND TRADEMARK OFFICE
CERTIFICATE OF CORRECTION

Page 1 of 1

PATENT NO.           : 10,297,084 B2
APPLICATION NO.      : 15/150995
DATED                : May 21, 2019
INVENTOR(S)          : Nachman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 82 days.

Signed and Sealed this
Nineteenth Day of May, 2020

Andrei Iancu
*Director of the United States Patent and Trademark Office*